(12) United States Patent
Tsai et al.

(10) Patent No.: US 8,261,161 B2
(45) Date of Patent: Sep. 4, 2012

(54) METHOD AND SYSTEM OF RECEIVING DATA WITH ENHANCED PARTIAL MATCHING

(75) Inventors: Tien-Ju Tsai, Tainan (TW); Cheng-Hsi Hung, Tainan (TW)

(73) Assignee: Himax Media Solutions, Inc., Tainan County (TW)

( * ) Notice: Subject to any disclaimer, the term of this patent is extended or adjusted under 35 U.S.C. 154(b) by 491 days.

(21) Appl. No.: 12/618,953

(22) Filed: Nov. 16, 2009

(65) Prior Publication Data

US 2011/0119545 A1    May 19, 2011

(51) Int. Cl.
*G06F 11/00* (2006.01)

(52) U.S. Cl. .................................. 714/776; 375/343

(58) Field of Classification Search .................. 714/746, 714/776, 799; 370/253; 375/343
See application file for complete search history.

(56) References Cited

U.S. PATENT DOCUMENTS

| 2009/0122926 A1* | 5/2009 | Azenkot et al. | 375/343 |
| 2011/0116534 A1* | 5/2011 | Seibert et al. | 375/224 |

* cited by examiner

*Primary Examiner* — Scott Baderman
*Assistant Examiner* — Joseph Kudirka
(74) *Attorney, Agent, or Firm* — Stout, Uxa, Buyan & Mullins, LLP

(57) ABSTRACT

A method and system of receiving data with enhanced partial matching is disclosed. A received word is compared with the frame code to determine mismatch bit(s). Subsequently, a determination is made whether the mismatch bit(s) are at positions of defined critical bits. If the mismatch bit(s) are not critical, the received word is then affirmed.

16 Claims, 19 Drawing Sheets

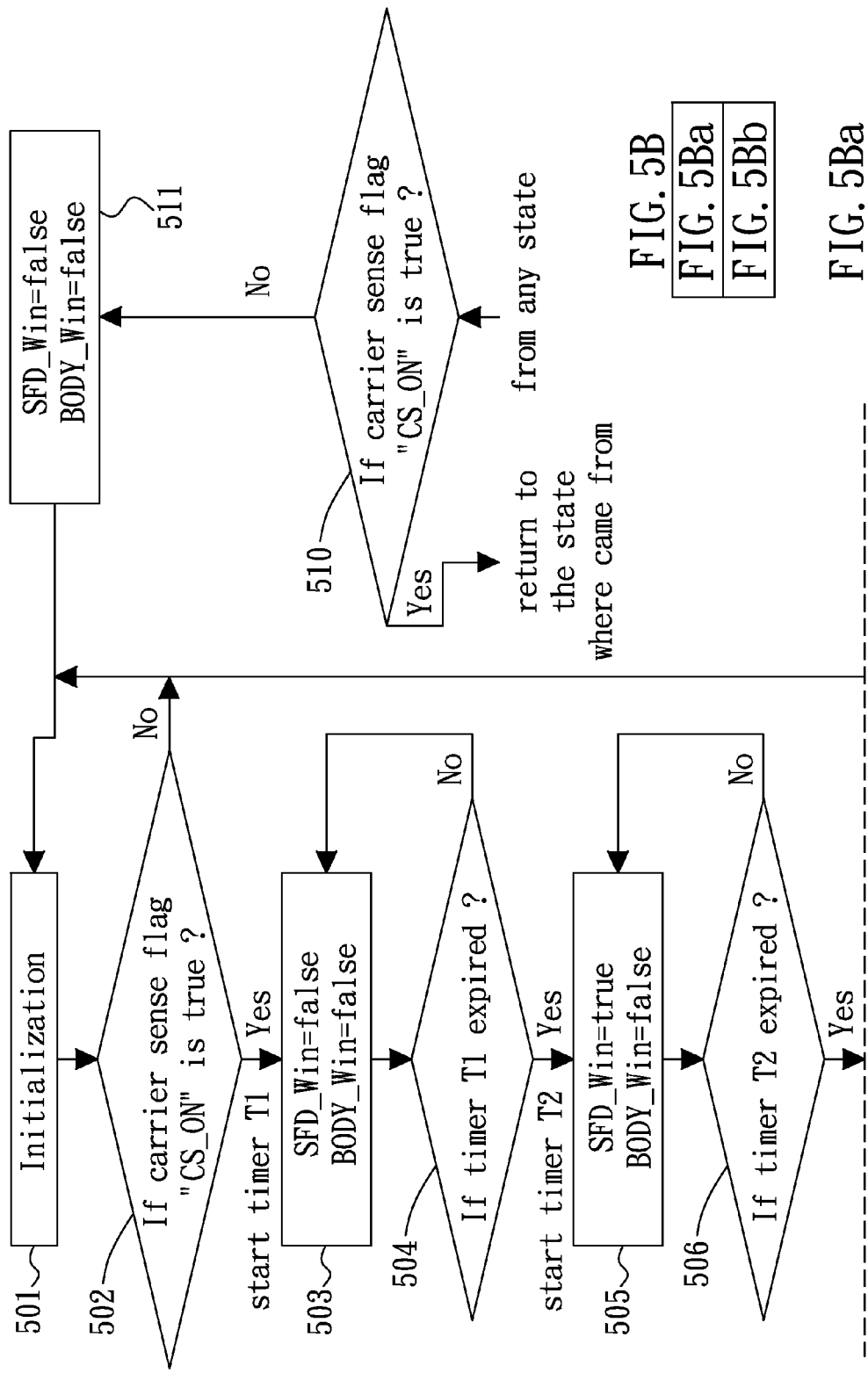

METHOD AND SYSTEM OF RECEIVING DATA WITH ENHANCED PARTIAL MATCHING

BACKGROUND OF THE INVENTION

1. Field of the Invention

The present invention generally relates to a communication system, and more particularly to robust reception of a packet-based asynchronous communication over a noisy channel.

2. Description of Related Art

Asynchronous transmission mode (or asynchronous transfer mode, ATM) is a packet-oriented transfer technology that transfers finite-length packets in the "physical layer." The asynchronous transmission mode is widely adapted to, for example, Teletext, closed captioning (CC), and Video Programming System (VPS) contexts in broadcast television systems (e.g., NTSC, PAL or SECAM), as well as 10BASE Ethernet and wireless local area network (e.g., IEEE 802.11) protocols.

In a transmitter of the asynchronous transmission mode, during an idle or silent period no signal is transmitted (from the physical layer) through the transmission media until the data link layer makes a request. On the other hand, before a receiver of the asynchronous transmission mode may effectively and correctly recover the transmitted data, some pre-measures have to be performed such as signal level estimation and compensation, channel estimation/equalization, carrier synchronization, symbol synchronization, and frame synchronization.

In order to facilitate those pre-measures, a preamble (or clock run-in) and a frame code (or start-of-frame delimiter, SFD) are incorporated (by the "data link layer") preceding the "data body" that contains the transmitted information. FIG. 1 shows a waveform of a transmitted packet. The preamble is used to assist the receiver in performing the signal level/channel estimation, channel estimation/equalization and symbol synchronization; the frame code is used to help the receiver determine the beginning of the data body.

Specifically, a predefined SFD pattern is compared to the received word to determine the end of the SFD, or in other words, the beginning of the data body. For example, "10101011" is used as the predefined SFD pattern in the 10BASE Ethernet protocol. Nevertheless, for a low signal-to-noise (SNR) noisy channel, particularly in a wireless or long-haul communication system, it may be probable that either the predefined SFD pattern is never matched to the received SFD (i.e., mismatching), resulting in data loss, or that a portion other than the received SFD is mistaken for the predefined SFD (i.e., false matching), resulting in an invalid packet reception. In order to resolve these situations, a loose partial matching scheme is usually used instead, whereby one or more bits of the predefined SFD pattern are allowed to be overlooked. However, the partial matching scheme increases the probability of false matching.

FIG. 2A to FIG. 2E show some SFD matching examples. In FIG. 2A, the predefined SFD pattern ("11100100" in the example) is fully matched to the received SFD. In FIG. 2B, a received datum has been corrupted in a noisy channel. The received bit (Rx_Bit) with a dashed circle is an error bit caused by noise. The predefined SFD pattern will be mismatched if the full matching scheme is used. FIG. 2C shows multiple error bits corresponding to more received data having been corrupted in the noisy channel. Accordingly, the predefined SFD pattern will be falsely matched if the full matching scheme is used. In FIG. 2D, a partial matching (e.g., 7-bit partial matching) scheme is used, and, accordingly, the predefined SFD pattern is falsely matched. In FIG. 2E, a looser partial matching (e.g., 6-bit partial matching) scheme is used, and, accordingly, the predefined SFD pattern is also falsely matched.

For the reason that conventional partial matching methods tend not to effectively and correctly determine the beginning of the data body, a need has arisen to propose a novel partial matching scheme that can improve the conventional partial matching.

SUMMARY OF THE INVENTION

In view of the foregoing, it is an object of the present invention to provide a method and system of receiving data with enhanced partial matching in order to substantially decrease the probability of frame code (SFD) false matching.

According to one embodiment, a correlated pattern is defined as (e.g., to be made of) a partial preamble and a partial frame code, and critical bits are defined as bit positions at which the correlated pattern is different from the frame code. A received word is compared with the frame code to determine mismatch bit(s). Subsequently, determination is made whether the mismatch bit(s) are at positions of the critical bits. The received word is then affirmed when the mismatch bit(s) are not at the positions of the critical bits.

DETAILED DESCRIPTION OF THE INVENTION

Figure 1:
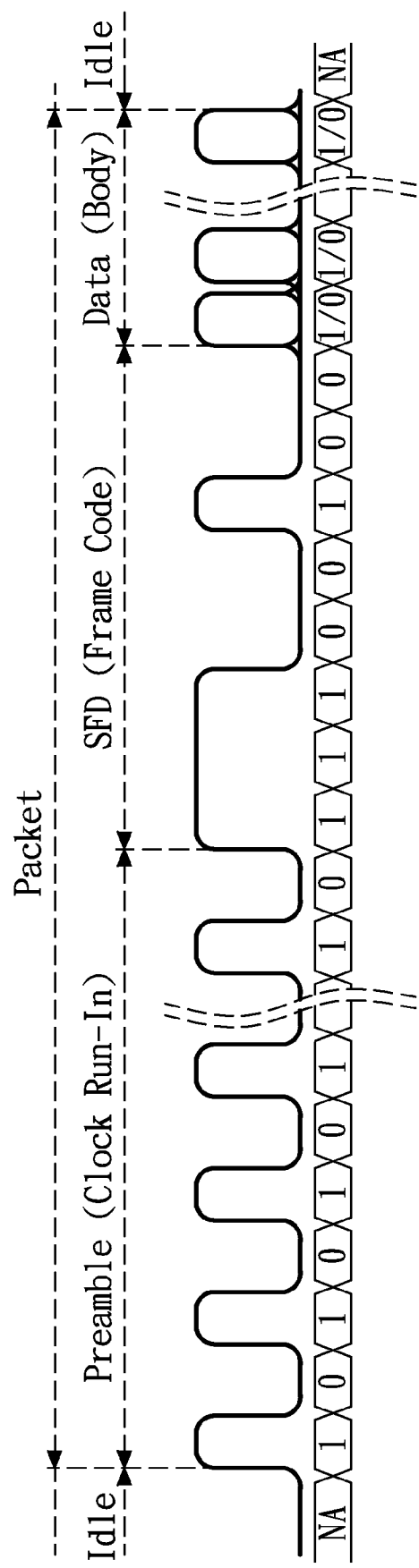
FIG. 1 shows a waveform of a transmitted packet.
Figure 2A:
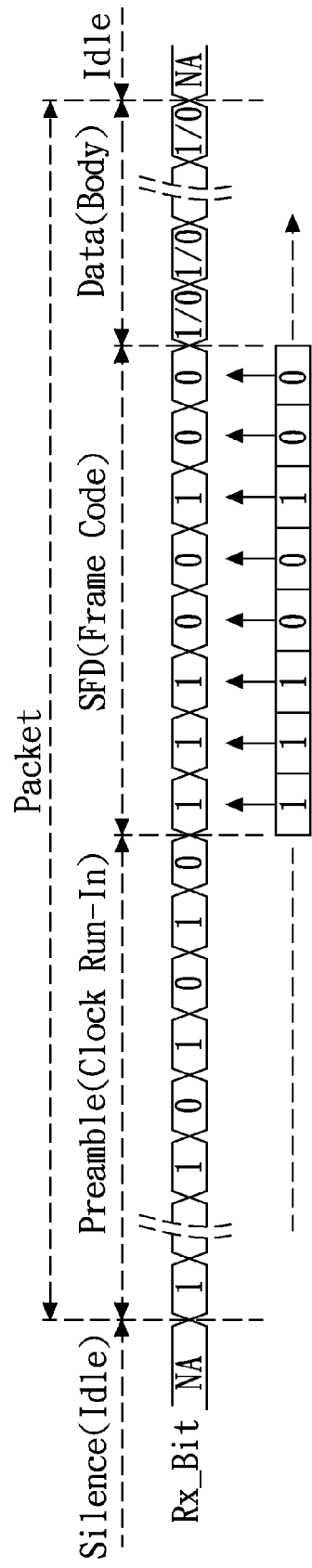
FIG. 2A to FIG. 2E show SFD matching examples.
Figure 2B:
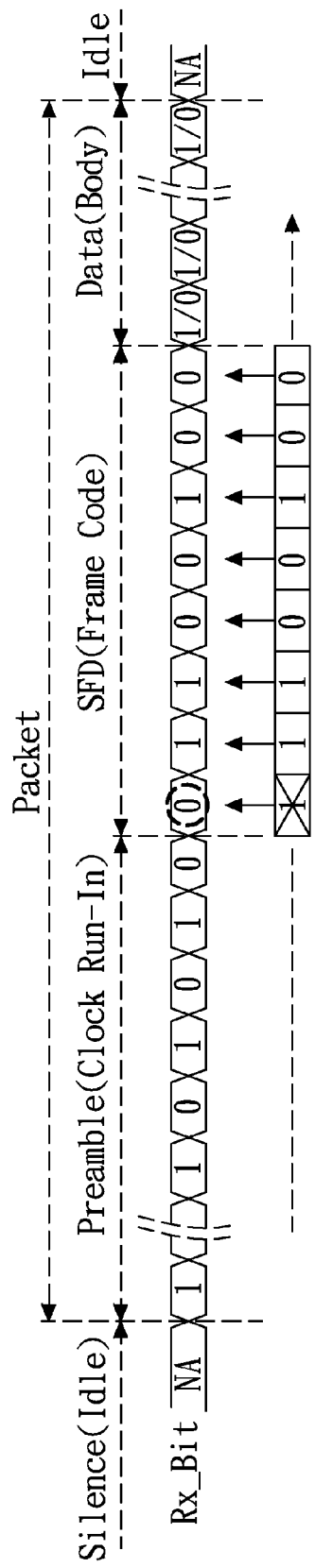
Figure 2C:
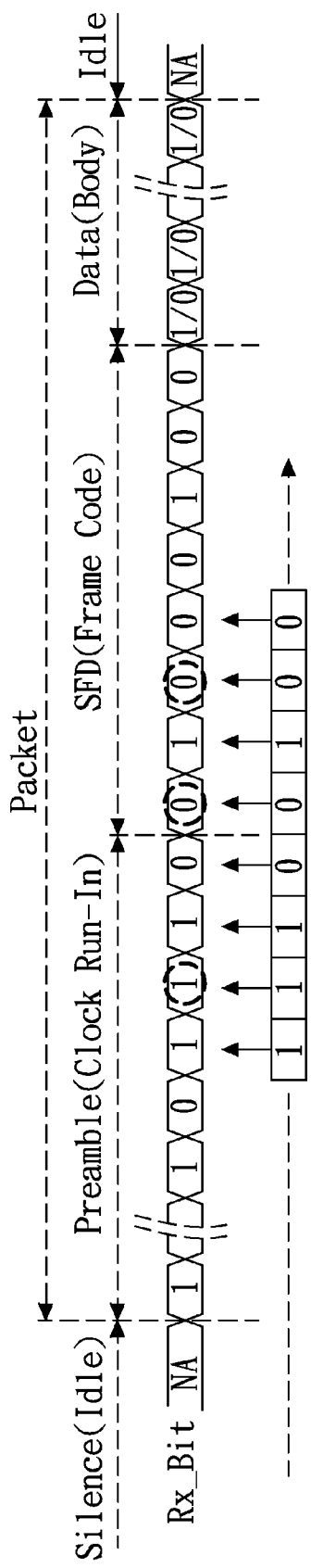
Figure 2D:
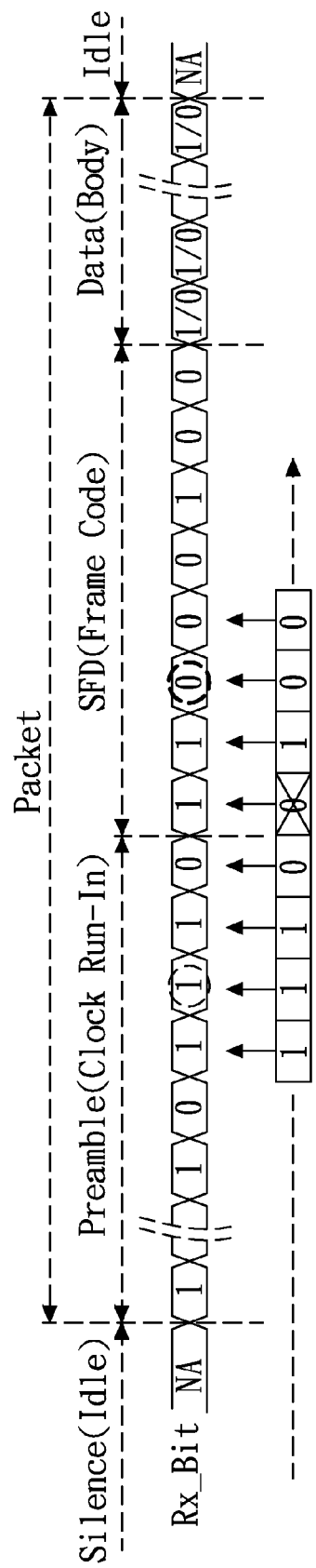
Figure 2E:
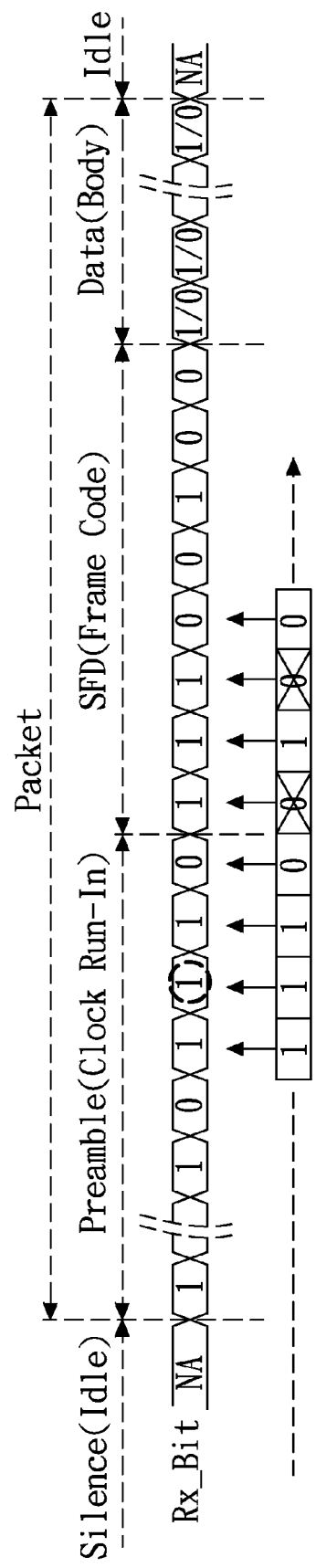
Figure 3:
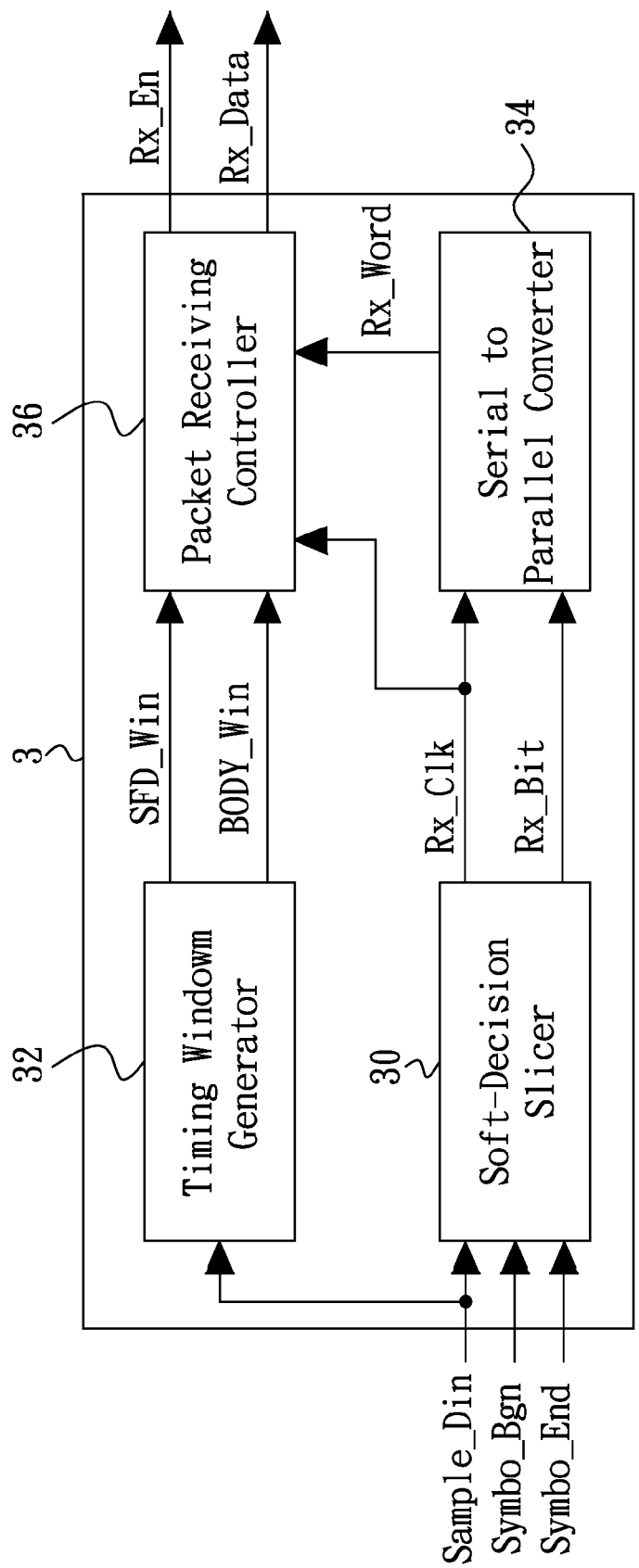
FIG. 3 illustrates a system which includes a soft-decision slicer and which receives data with enhanced partial matching according to one embodiment of the present invention.
Figure 4A:
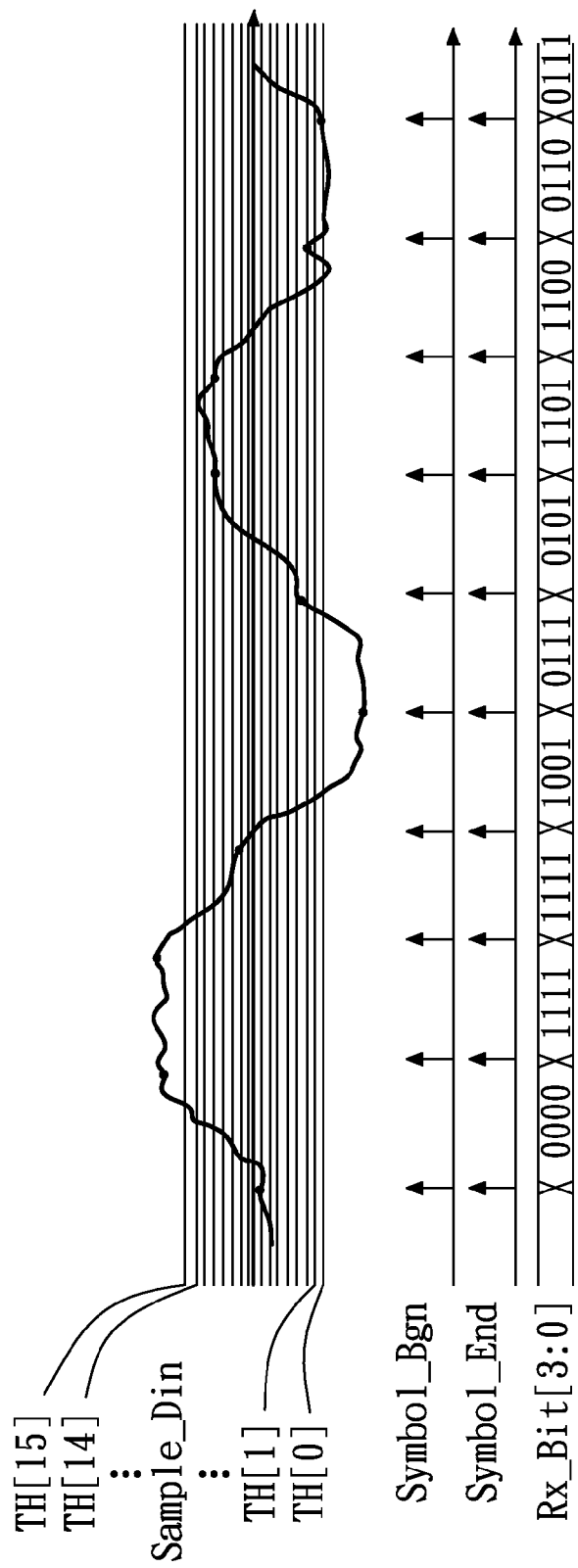
FIG. 4A shows an exemplary waveform of input data for the soft-decision slicer.

FIG. 3 is a block diagram illustrating a system 3 for or capable of receiving data with enhanced partial matching according to one embodiment of the present invention. The system 3 primarily includes a soft-decision slicer 30, a timing window generator 32, a serial-to-parallel converter 34, and a packet receiving controller 36. The soft-decision slicer 30 receives input data (Sample_Din), which has a waveform exemplified in FIG. 4A. In this example, data bits 0, 1, 1, 1, 0, 0, 1, 1, 0, 0 are received in sequence. In the waveform diagram, TH[0] to TH[15] represent respective quantization levels. The soft-decision slicer 30 outputs multiple received bits (Rx_Bit) (four bits in this embodiment) with respect to (e.g., for) each bit of the original input data (Sample_Din). In other words, every four received bits (Rx_Bit) equivalently represent one data bit of the original input data (Sample_Din).

Specifically, the most significant bit (MSB) of the four received bits (Rx_Bit) represents the data bit of the original input data (Sample_Din), and the other bits contain reliability information (or norm). Table 1 lists some sequences of the received bits (Rx_Bit) and corresponding reliabilities. The norm indicates the reliability or the strength of the associated MSB data bit. For example, "1111" indicates a strongest "1"; "1000" indicates a weakest "$\overline{1}$"; "0111" indicates strongest "$\overline{0}$"; and "0000" indicates weakest "$\overline{0}$". The data bit with strongest reliability presumably is (e.g., assumes) least affected by noise, while a data bit with weakest reliability presumably is (e.g., assumes) greatly affected by noise.

TABLE 1

| MSB | Norm | Reliability |
|---|---|---|
| 1 | 1 1 1 | Strongest "1" |
| 1 | 1 1 0 | Relatively strong "1" |
| ... | | |
| 1 | 0 0 1 | Relatively weak "1" |
| 1 | 0 0 0 | Weakest "1" |
| 0 | 0 0 0 | Weakest "0" |
| 0 | 0 0 1 | Relatively weak "0" |
| ... | | |
| 0 | 1 1 0 | Relatively strong "0" |
| 0 | 1 1 1 | Strongest "0" |

Figure 4B:
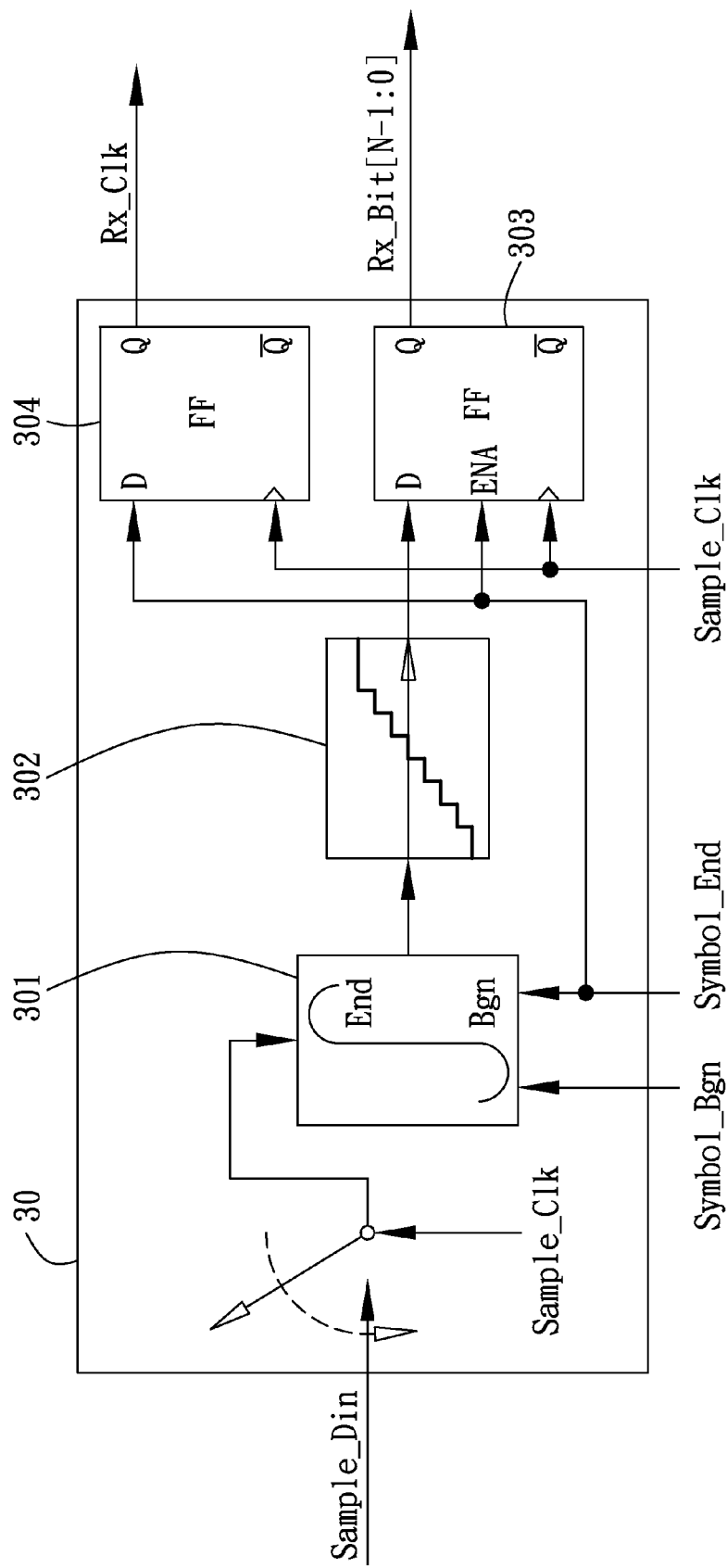
FIG. 4B is a circuit-level depiction of the soft-decision slicer.

FIG. 4B shows a circuit implementation of the soft-decision slicer 30 (FIG. 3). Specifically, the input data (Sample_Din) are intermittently sampled under a sampling clock (Sample_Clk), for example by a sampling switch. The sampled data are then integrated by an integrator 301 with control signals Symbol_Bgn and Symbol_End that control the beginning and the end of the integrator 301. The integrated output is then forwarded to a quantizer 302. The output of the quantizer 302 (e.g., four-bit output in the example) is collected as the received bits (Rx_Bit) by a flip-flop 303, before sending to the serial-to-parallel converter 34. At the same time, a clock (Rx_Clk) corresponding to timing of the received bits (Rx-Bit) is also generated by another flip-flop 304.

Turning again to FIG. 3, the received bits (Rx_Bit) subsequently are forwarded in sequence to the serial-to-parallel converter 34 (FIG. 3), and then packed into data words (Rx_Word). Some exemplary circuits of the serial-to-parallel converter 34 are disclosed in U.S. patent application Ser. No. 12/498,345, entitled "Method and System of Receiving Data with Enhanced Error Correction," assigned to the same assignee, the disclosure of which is hereby incorporated by reference.

The timing window generator 32 generates some window signals, such as a frame-code window signal (SFD_Win) and data-body window signal (BODY_Win), that define periods for executing some specific tasks, respectively. For example, the frame-code window signal (SFD_Win) defines the period during which a frame code (or start-of-frame delimiter, SFD) may be recognized, and the data-body window signal (BODY_Win) defines the period during which a data body may be obtained.

Figure 5A:
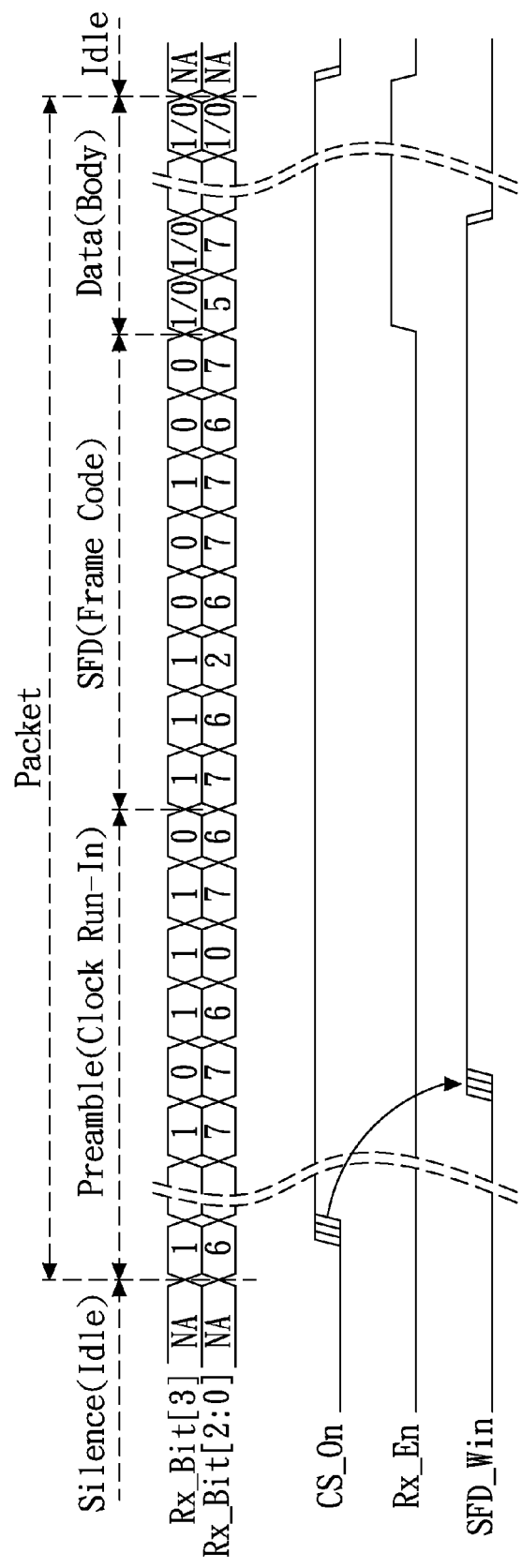
FIG. 5A shows exemplary received bits Rx_Bit, a frame-code window signal (SFD_Win), a receive-enable signal (Rx_En), and a carrier-sense flag (CS_On)

The window signals from the timing window generator 32 and the data words (Rx_Word) from the serial-to-parallel converter 34 are forwarded to the packet receiving controller 36, which accordingly recovers received data (Rx_Data) and a receive-enable signal (Rx_En) that indicates the beginning of the data body. FIG. 5A shows exemplary received bits Rx_Bit (from the soft-decision slicer 30), the frame-code window signal (SFD_Win), the receive-enable signal (Rx_En) and a carrier-sense flag (CS_On) indicating the presence of carrier signals.

Figure 5B:
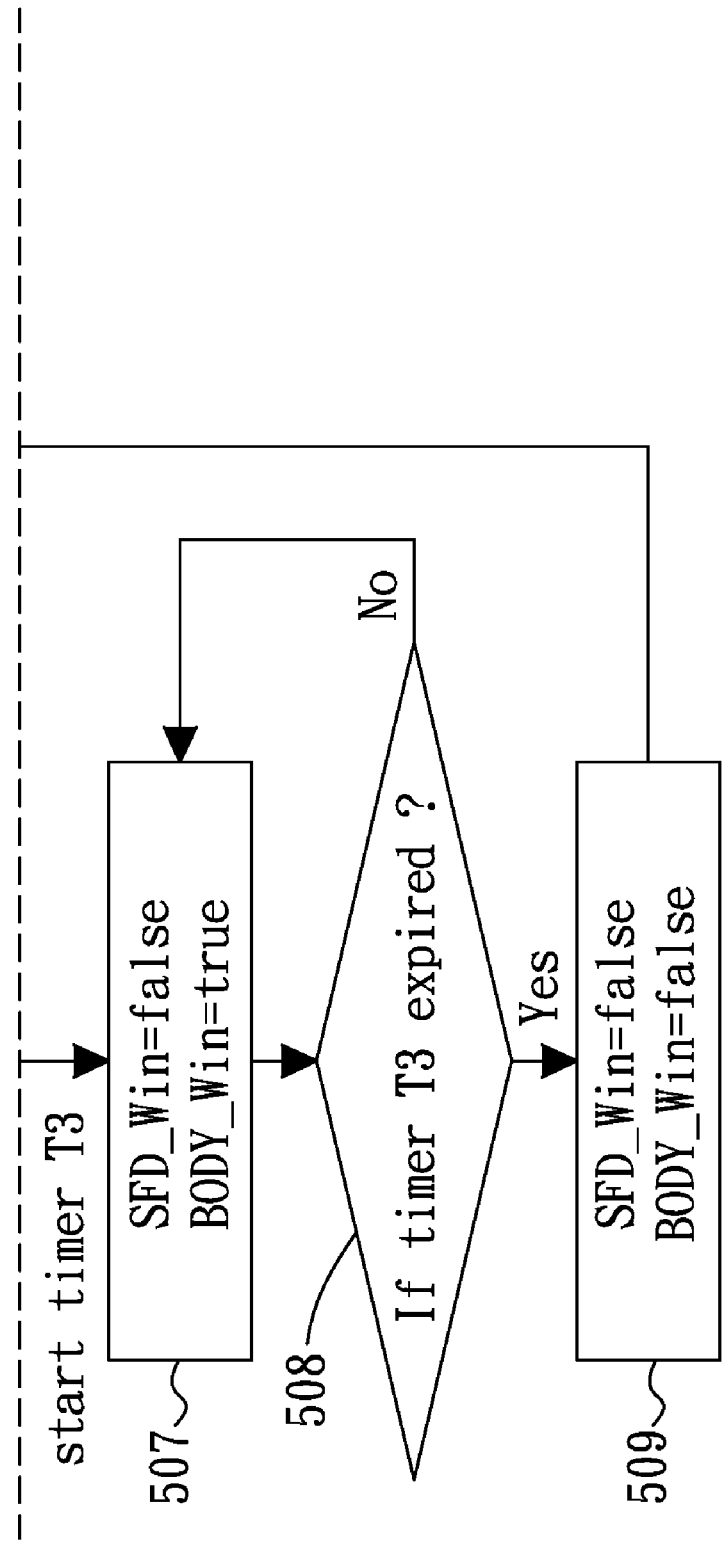
FIGS. 5Ba and 5Bb show a flow diagram for generating the frame-code window signal (SFD_Win) and a data-body window signal (BODY_Win) according to the embodiment of the present invention.
Figure 5C:
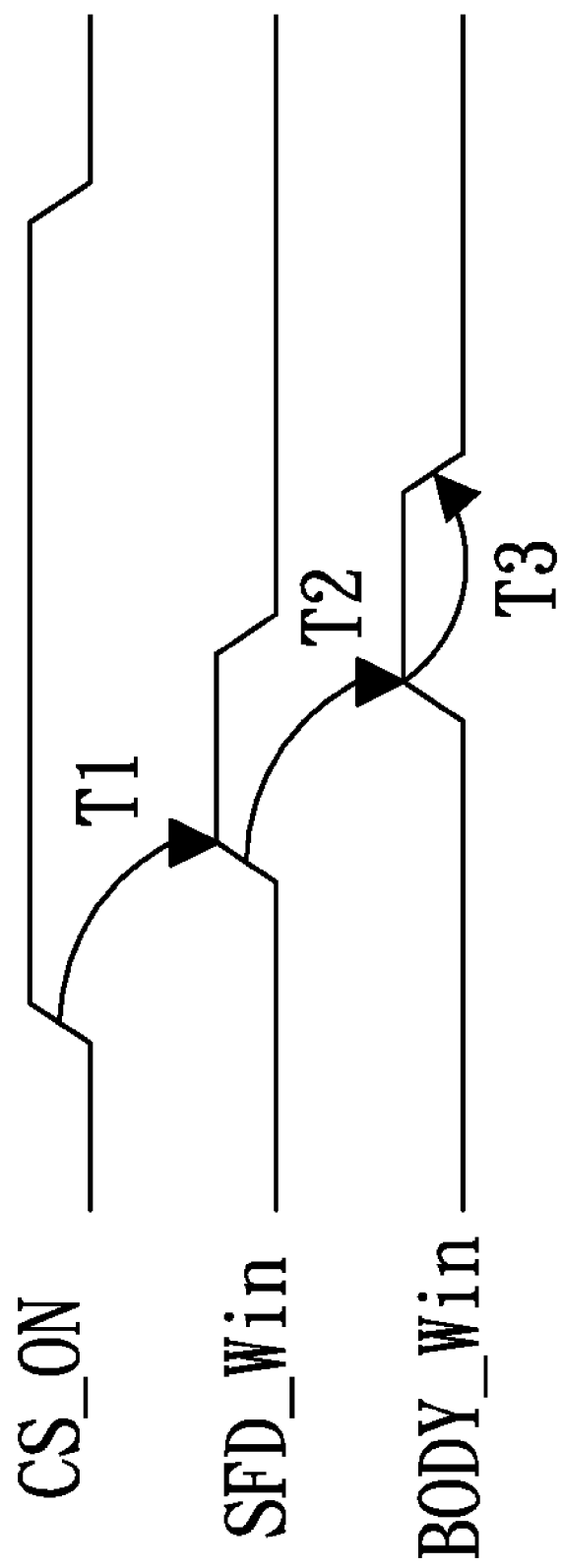
FIG. 5C shows simplified waveforms of the carrier-sense flag (CS_On), the frame-code window signal (SFD_Win) and the data-body window signal (BODY_Win), and timers T1, T2 and T3.

FIGS. 5Ba and 5Bb show a flow diagram for generating the frame-code window signal (SFD_Win) and the data-body window signal (BODY_Win) according to the embodiment of the present invention. After initialization (step 501), if the carrier-sense flag (CS_On) is asserted (step 502) indicating that the carrier signals are present, a first timer T1 starts while the frame-code window signal (SFD_Win) and the data-body window signal (BODY_Win) are de-asserted (step 503). After the first timer T1 expires (step 504), the frame-code window signal (SFD_Win) is asserted (step 505) and, at the same time, a second timer T2 starts. After the second timer T2 expires (step 506), the data-body window signal (BODY_Win) is asserted (step 507) and, at the same time, a third timer T3 starts. After the third timer T3 expires (step 508), the data-body window signal (BODY_Win) is de-asserted (step 509) corresponding to completion of one reception cycle. FIG. 5C shows simplified waveforms of the carrier-sense flag (CS_On), the frame-code window signal (SFD_Win) and the data-body window signal (BODY_Win), along with the timers T1, T2 and T3. It is noted that, at any state, if the carrier-sense flag (CS_On) becomes de-asserted (step 510), the frame-code window signal (SFD_Win) and the data-body window signal (BODY_Win) are forced to become de-asserted (step 511), and the reception cycle restarts.

Figure 5D:
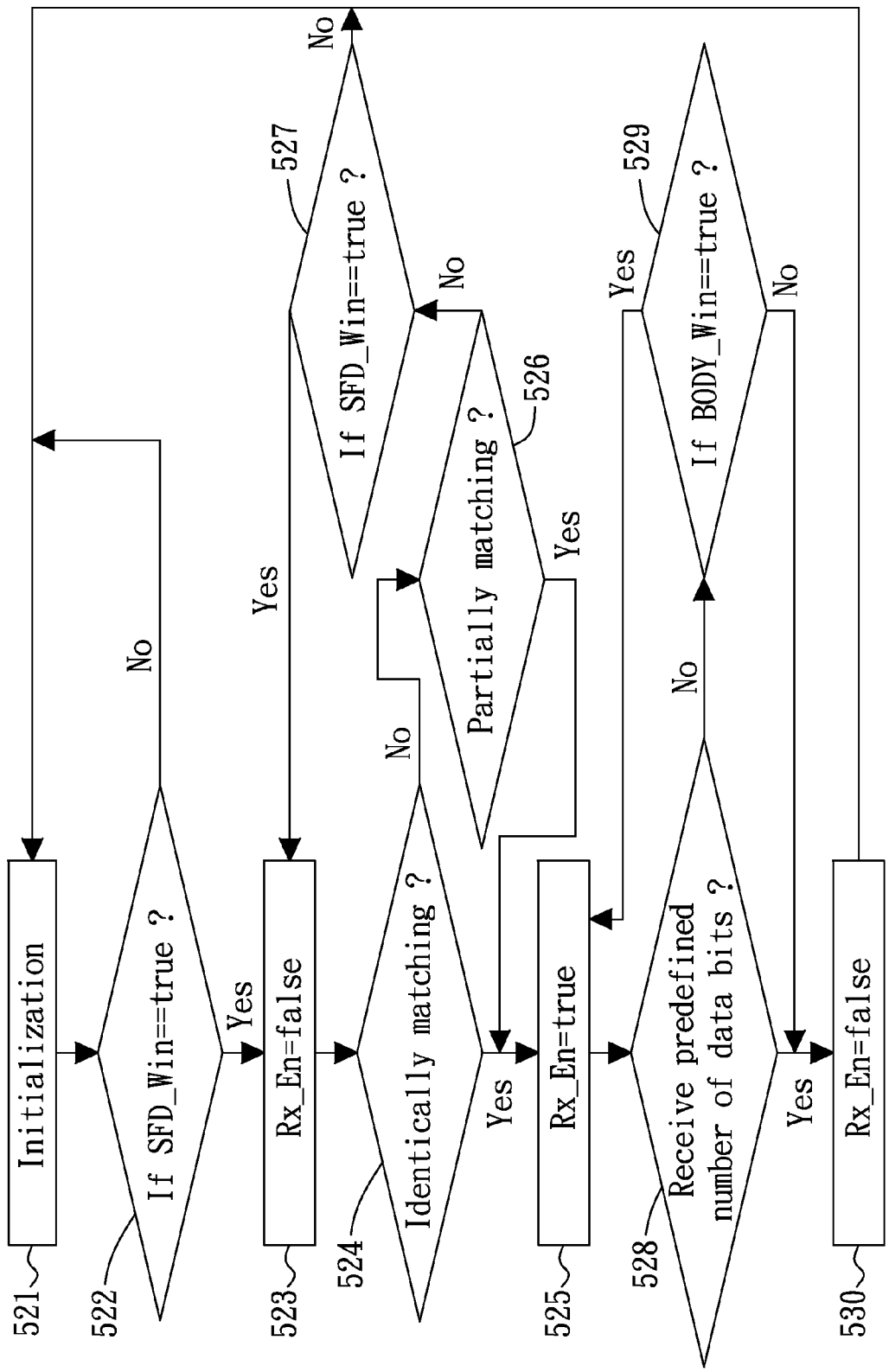
FIG. 5D shows a flow diagram for generating the receive-enable signal (Rx_En) according to the embodiment of the present invention.

FIG. 5D shows a flow diagram for generating the receive-enable signal (Rx_En) according to the embodiment of the present invention. After initialization (step 521), if the frame-code window signal (SFD_Win) is asserted (step 522), the receive-enable signal (Rx_En) is first de-asserted (step 523). Subsequently, if the latest received word is identically matched to the frame code (SFD) pattern (step 524), the receive-enable signal (Rx_En) is asserted (step 525). Otherwise, a partial matching (step 526) is further performed. If the latest received word is partially matched to the frame code (SFD) pattern (step 526), the receive-enable signal (Rx_En) is asserted (step 525); otherwise, the receive-enable signal (Rx_En) stays de-asserted (step 523) provided that the frame-code window signal (SFD_Win) is asserted (step 527). After the receive-enable signal (Rx_En) is asserted in step 525, body data are received continuously until a predefined number of data bits has been reached (step 528), provided that the data-body window signal (BODY_Win) remains asserted (step 529). When a complete data body has been received, the receive-enable signal (Rx_En) is de-asserted (step 530), thus completing the reception cycle.

As explained in the DESCRIPTION OF RELATED ART section, in a partial matching scheme, the predefined frame code (or SFD) pattern is susceptible to false matching by incorrect incorporation of some preamble (or clock run-in) bits into the frame code. In order to overcome this drawback in the conventional partial matching scheme, a correlated pattern and associated critical bits are defined, in the present embodiment, and are then used during the partial matching process. The correlated pattern is a pattern that is made of partial preamble and partial SFD, which are connected to each other in a consecutive manner. Furthermore, the correlated pattern is relatively similar to, but not the same as, the predefined frame code pattern. The critical bits are bit positions at which the correlated pattern is different from the frame code.

Figure 6A:
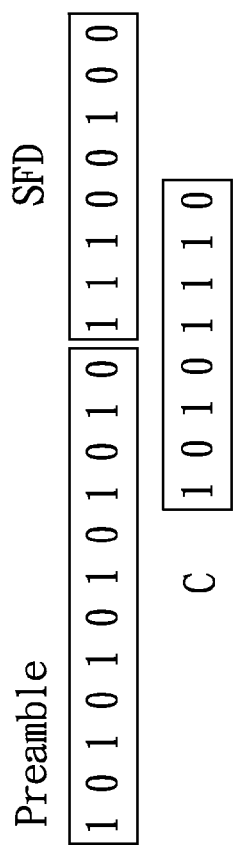
FIG. 6A shows an exemplary preamble, frame code SFD, and correlated pattern C.
Figure 6B:
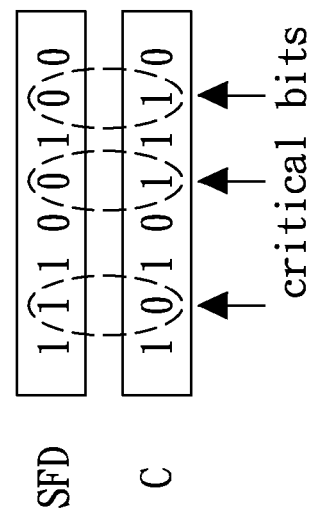
FIG. 6B shows the exemplary frame code SFD and correlated pattern C, and the associated critical bits.

FIG. 6A shows an exemplary preamble, frame code SFD, and correlated pattern C. In this example, the correlated pattern C is made of the last four bits of the preamble and the first four bits of the frame code SFD. FIG. 6B shows the exemplary frame code SFD and correlated pattern C, and the associated critical bits. The frame code SFD and the correlated pattern C are different from each other at the critical bits (e.g., bit 6, bit 3 and bit 1 in the example).

Figure 6C:
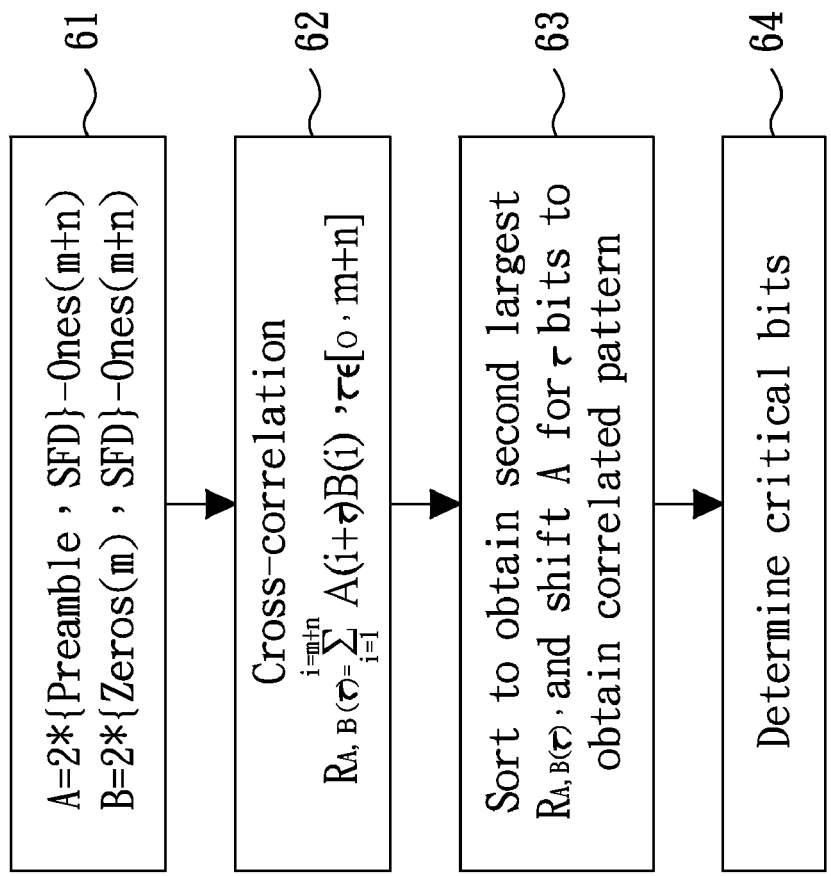
FIG. 6C shows a flow diagram for obtaining the correlated pattern and the associated critical bit(s) according to the embodiment of the present invention.

The correlated pattern and the associated critical bit(s) may be systematically obtained according to the flow illustrated in FIG. 6C. In step 61, two vectors A and B are first defined according to the preamble and the frame code SFD as follows:

$$A = 2*\{Preamble, SFD\} - Ones(m+n)$$

$$B = 2*\{Zeros(m), SFD\} - Ones(m+n)$$

where m and n represent the bit numbers of the preamble and the frame code SFD, respectively; Ones(i) represents a vector made of i bits having a "1" value, and Zeros(i) represents a vector made of i bits having a "0" value.

For example, when Preamble=[1010101010101010] and SFD=[11100100], then the vectors A and B are A={+1,−1,+1,−1,+1,−1,+1,−1,+1,−1,+1,−1,+1,−1,+1,+1,+1,−1,−1,+1,−1,−1} and B={−1,−1,−1,−1,−1,−1,−1,−1,−1,−1,−1,−1,−1,−1,−1,+1,+1,+1,−1,−1,+1,−1,−1}.

Subsequently, in step 62, the cross-correlation of the vector A and the vector B is calculated to measure the similarity between the vectors A and B as follows:

$$R_{A,B}(\tau) = \sum_{i=1}^{i=m+n} A(i+\tau)B(i) \text{ for } \tau \in [0, m+n]$$

In step 63, all of the cross-correlation results are sorted to obtain the second largest cross-correlation result. For the example described above, the second largest cross-correlation result is $R_{A,B}(4)=+2$. Afterwards, the vector A is shifted for τ bits, and the last eight bits of the vector A are retrieved as the correlated pattern C, where "+1" equivalently represents the bit "1" and "−1" equivalently represents the bit "0".

Finally, in step 64, critical bits are determined as the positions where the frame code SFD and the correlated pattern C are different from each other. For example, as shown in FIG. 6B, the frame code SFD and the correlated pattern C are different from each other at critical bit 6, bit 3 and bit 1.

Figure 7:
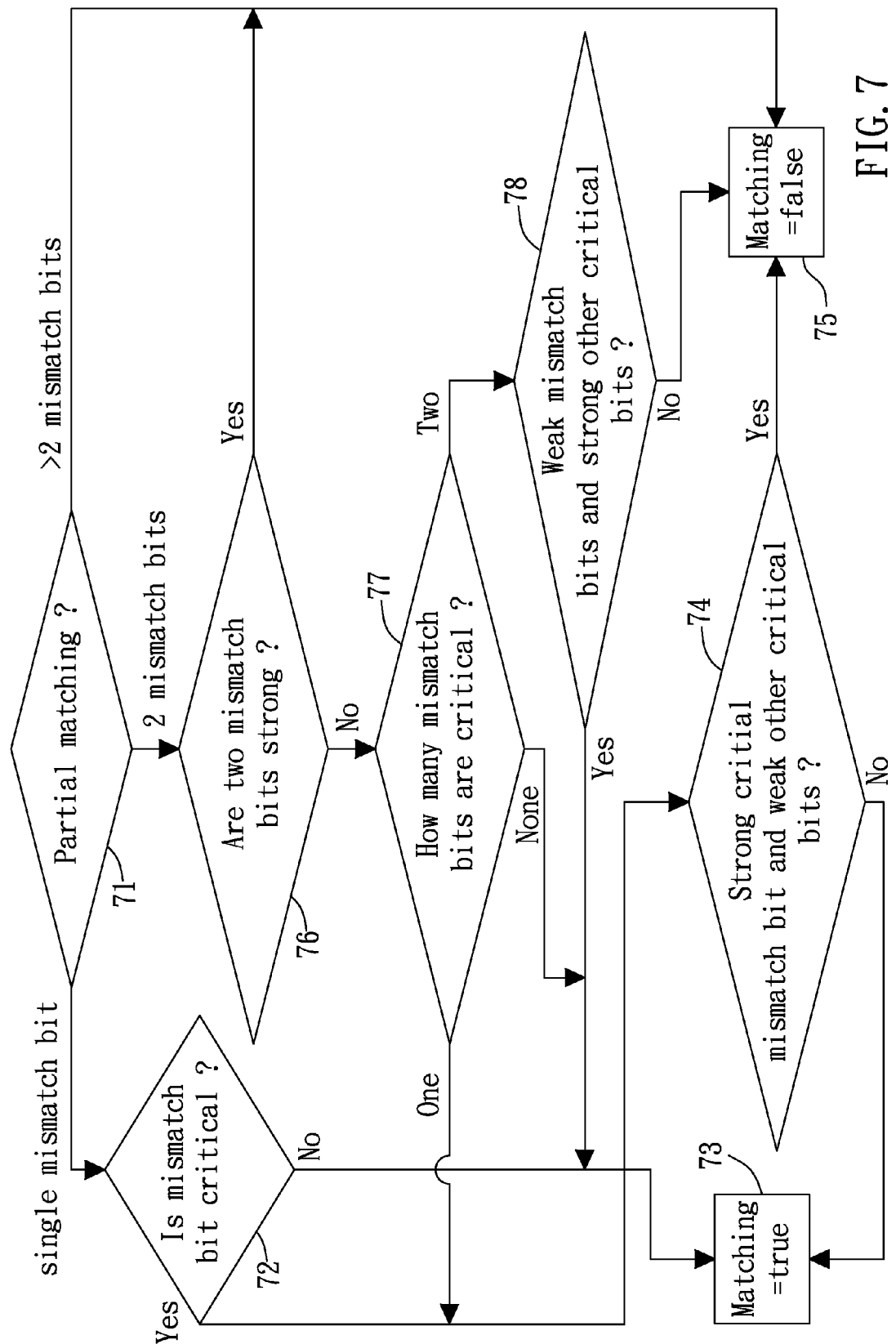
FIG. 7 shows a flow diagram that illustrates a method of receiving data with enhanced partial matching according to one embodiment of the present invention.

FIG. 7 shows a flow diagram illustrative of a method for receiving data with enhanced partial matching according to one embodiment of the present invention. It is noted that the flow shown in FIG. 7 may be part (e.g., step 526) of the entire flow as shown in FIG. 5D. Although reliability bits (or norm) are used in this embodiment, it is appreciated by those skilled in the pertinent art that the disclosed method of partial matching with critical bit(s) may be preformed without considering the norm. An 8-bit frame code SFD and a 6-bit partial matching exemplify the embodiment but do not limit the scope of the present invention.

In step 71, a (conventional) partial matching is performed. In the embodiment, a 6-bit partial matching is used, that is, at most two bits are permitted to be different from the predefined frame code (e.g., [11100100]). Consider the case in which the received bits (Rx_Bit) pass the partial matching and a single mismatch bit occurs, such as in the case of bits group 80 shown in FIG. 8A. The received bits (Rx_Bit) with dashed circles are error bits caused by noise. Subsequently, in step 72, the method determines whether the single mismatch bit is at the position of the critical bits. If the single mismatch bit is not critical, the partial matching is affirmed or passes (step 73). Otherwise, if the single mismatch bit is critical (e.g., bit 3 in the example), step 74 is further performed to determine whether the mismatch bit is strong enough (e.g., having a norm greater than a predefined first threshold (Norm_TH1)), and the other critical bits (e.g., bit 6 and bit 1 in the example) are weak enough (e.g., having a norm less than a predefined second threshold (Norm_TH2)). If the determination in step 74 is positive (i.e., indicating that the critical mismatch bit is strongly reliable), the partial matching is negated or fails (step 75); otherwise, the partial matching is affirmed or passes (step 73).

Figure 8A:
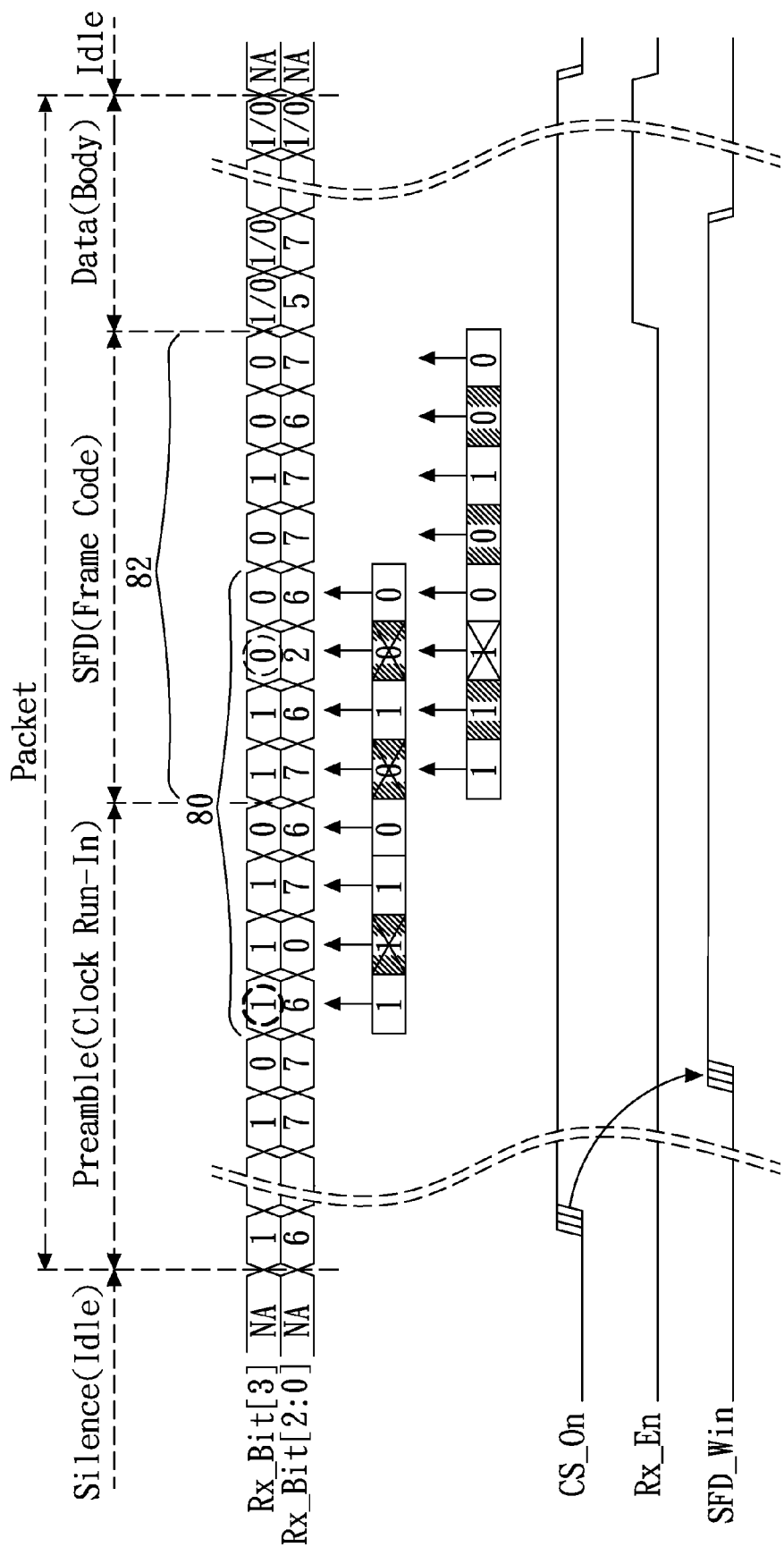
FIG. 8A shows exemplary received bits Rx_Bit and the performance of the enhanced partial matching.

For the exemplary bits group 80 in FIG. 8A, the single mismatch bit 3 is critical (the "Yes" branch of step 72); furthermore, the critical mismatch bit 3 is strong (with strong norm "7"), and the other critical bits 6/1 are weak (with weak norm "0"/"2") (the "Yes" branch of step 74). Therefore, the partial matching is negated (step 75). For another exemplary bits group 82 in FIG. 8A, the single mismatch bit 5 is not critical (the "No" branch of step 72); therefore, the partial matching is affirmed (step 73).

Figure 8B:
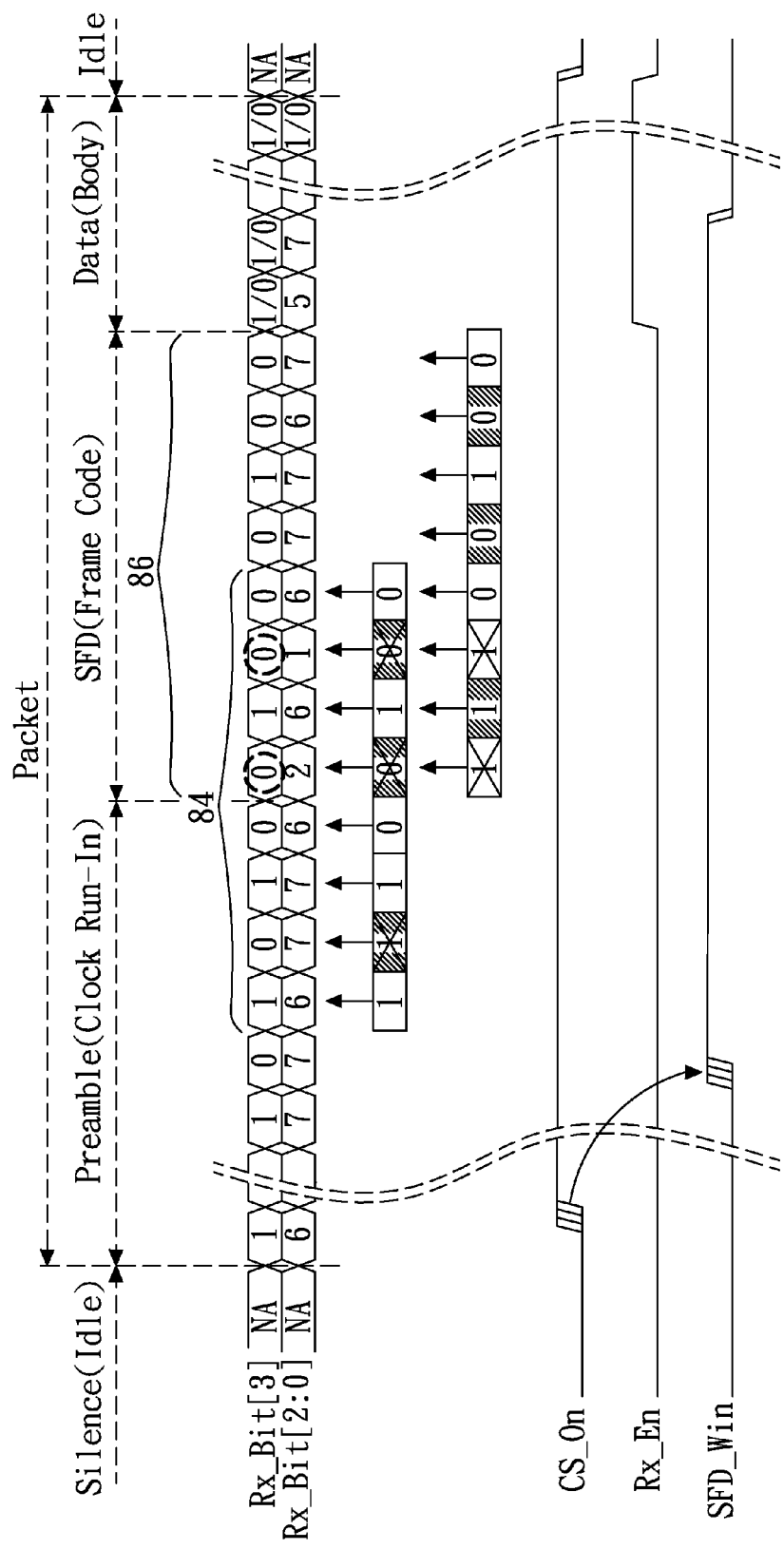
FIG. 8B shows additional exemplary received bits Rx_Bit and the performance of the enhanced partial matching.

For an exemplary bits group 84 in FIG. 8B, the single mismatch bit 6 is critical (the "Yes" branch of step 72); furthermore, the critical mismatch bit 6 is strong (with strong norm "7"), and the other critical bits 3/1 are weak (with weak norm "2"/"1") (the "Yes" branch of step 74). Therefore, the partial matching is negated (step 75).

Next, consider the case in which the received bits (Rx_Bit) pass the partial matching and two mismatch bits occur. Subsequently, in step 76, the method determines whether the two mismatch bits are strong enough (e.g., having a norm greater than the predefined first threshold (Norm_TH1)). If the determination in step 76 is positive (i.e., indicating that the critical mismatch bits are reliable), the partial matching is negated or fails (step 75). Otherwise, in step 77, the method determines how many mismatch bits are critical. In the case of no critical mismatch bit, the partial matching is affirmed (step 73). In the case of one critical mismatch bit, step 74 is performed in the manner as described above. In the case of two critical mismatch bits, step 78 is performed to determine whether the two mismatch bits are weak enough (e.g., having a norm less than a predefined third threshold (Norm_TH3)), and the other critical bit is strong enough (e.g., having a norm greater than a predefined fourth threshold (Norm_TH4)). If the determination in step 78 is positive (i.e., indicating that the mismatch bits are not reliable), the partial matching is affirmed or passes (step 73); otherwise, the partial matching is negative or fails (step 75).

For an exemplary bits group 86 in FIG. 8B, the two mismatch bits 7 and 5 are not strong (the "No" branch of step 76); the mismatch bits are not critical (the "none" branch of step 77); therefore, the partial matching is affirmed (step 73).

Although specific embodiments have been illustrated and described, it will be appreciated by those skilled in the art that various modifications may be made without departing from the scope of the present invention, which is intended to be limited solely by the appended claims.

What is claimed is:

1. A method of receiving data with enhanced partial matching, comprising:
   defining a correlated pattern which is made of a portion of a preamble and a portion of a frame code;
   defining critical bits which are bit positions at which the correlated pattern is different from the frame code;
   comparing a received word with the frame code to determine mismatch bit(s);
   determining whether the mismatch bit(s) are at positions of the critical bits; and
   affirming the received word when the mismatch bit(s) are not at the positions of the critical bits.

2. The method of claim 1, wherein the correlated pattern is obtained according to the following steps:
   defining a vector A and a vector B according to the preamble and the frame code;
   determining cross-correlation of the vector A and the vector B;
   sorting to obtain a second largest of cross-correlation results of the vector A and the vector B, wherein the second largest cross-correlation result has an argument $\tau$; and
   shifting the vector A for $\tau$ bits to obtain the correlated pattern, which has a length equal to that of the frame code.

3. The method of claim 2, wherein the vector A and the vector B are defined as follows:

$$A = 2*\{\text{Preamble},\text{SFD}\} - \text{Ones}(m+n),$$

$$B = 2*\{\text{Zeros}(m),\text{SFD}\} - \text{Ones}(m+n),$$

where m and n represent bit numbers of the preamble and the frame code start-of-frame delimiter (SFD), respectively, Ones(i) represents a vector made of i bits having a "1" value, and Zeros(i) represents a vector made of i bits having a "0" value.

4. The method of claim 3, wherein the cross-correlation $R_{A,B}$ is determined, as follows:

$$R_{A,B}(\tau) = \sum_{i=1}^{i=m+n} A(i+\tau)B(i) \text{ for } \tau \in [0, m+n].$$

5. The method of claim 1, further comprising a step of:
   generating reliability bits along with each bit of the received word.

6. The method of claim 5, further comprising a step of:
   determining the mismatch bit to be not at the positions of the critical bits, if the reliability hits of the mismatch bit have a value less than a predefined threshold.

7. The method of claim 5, further comprising a step of:
   negating the received word if the reliability bits of each of the mismatch bit(s) have a value greater than a predefined threshold.

8. A system of receiving data with enhanced partial matching, comprising:
   a serial-to-parallel converter configured to pack a plurality of received bits into a received word; and
   a packet receiving controller configured to compare the received word with a frame code to determine mismatch bit(s) and whether the mismatch bit(s) are at positions of critical bits,
   wherein a defined correlated pattern is made of a portion of a preamble and a portion of the frame code, and the critical bits are defined as bit positions at which the correlated pattern is different from the frame code, and
   wherein the packet receiving controller is configured to affirm the received word when the mismatch bit(s) are not at the positions of the critical bits.

9. The system of claim 8, wherein the system is configured to obtain the correlated pattern according to the following:
   a vector A and a vector B defined according to the preamble and the frame code;
   a cross-correlation of the vector A and the vector B; and
   a second largest of cross-correlation results of the vector A and the vector B that is obtained from sorting and that has an argument $\tau$, wherein the correlated pattern has a length equal to that of the frame code and is obtained from shifting the vector A for $\tau$ bits.

10. The system of claim 9, wherein the vector A and the vector B are defined as follows:

$$A = 2*\{\text{Preamble},\text{SFD}\} - \text{Ones}(m+n),$$

$$B = 2*\{\text{Zeros}(m),\text{SFD}\} - \text{Ones}(m+n),$$

where m and n represent bit numbers of the preamble and the frame code start-of-frame delimiter (SFD), respectively, Ones(i) represents a vector made of i bits having a "1" value, and Zeros(i) represents a vector made of i bits having a "0" value.

11. The system of claim 10, wherein the cross-correlation $R_{A,B}$ is defined according to the following:

$$R_{A,B}(\tau) = \sum_{i=1}^{i=m+n} A(i+\tau)B(i) \text{ for } \tau \in [0, m+n].$$

12. The system of claim 8, further comprising a slicer configured to generate reliability bits along with each bit of the received word.

13. The system of claim 12, wherein the packet receiving controller is further configured to determine the mismatch bit to be not at the positions of the critical bits, if the reliability bits of the mismatch bit have a value less than a predefined threshold.

14. The system of claim 12, wherein the packet receiving controller is further configured to negate the received word if the reliability bits of each of the mismatch bit(s) have a value greater than a predefined threshold.

15. The system of claim 8, wherein the packet receiving controller is further configured to generate a receive-enable signal whenever the received word is affirmed, indicating beginning of a data body following the frame code.

16. The system of claim 15, further comprising a timing window generator configured to generate a frame-code window signal and a data-body window signal, wherein the frame-code window signal defines a period during which the frame code may be recognized, and the data-body window signal defines another period, during which the data body may be obtained.

* * * * *